3 Sheets--Sheet 1.

JOHN McLEISH.
Combined Corn Harvester and Husker.

No. 125,318. Patented April 2, 1872.

WITNESSES  
Wm A Steel  
John Parker

John McLeish  
by his attys.  
Howson and Son

JOHN McLEISH.
Combined Corn Harvester and Husker.

No. 125,318.  Patented April 2, 1872.

WITNESSES  John McLeish

JOHN McLEISH.
Combined Corn Harvester and Husker.
No. 125,318. Patented April 2, 1872.

125,318

UNITED STATES PATENT OFFICE.

JOHN McLEISH, OF CHICAGO, ILLINOIS, ASSIGNOR TO WILLIAM. H. RICHARDSON, OF PHILADELPHIA, PENNSYLVANIA.

IMPROVEMENT IN COMBINED CORN-HARVESTERS AND HUSKERS.

Specification forming part of Letters Patent No. 125,318, dated April 2, 1872.

SPECIFICATION.

I, JOHN McLEISH, of Chicago, county of Cook, State of Illinois, have invented an Improved Corn Harvester and Husker, of which the following is a specification:

My invention consists of certain improvements, too fully explained hereafter to need preliminary description, in that class of corn-harvesters in which the stalks are severed, the ears separated from the same and from the husks and deposited in a suitable receptacle, and the collected stalks dropped in bundles or bunches upon the ground.

Figure 1:
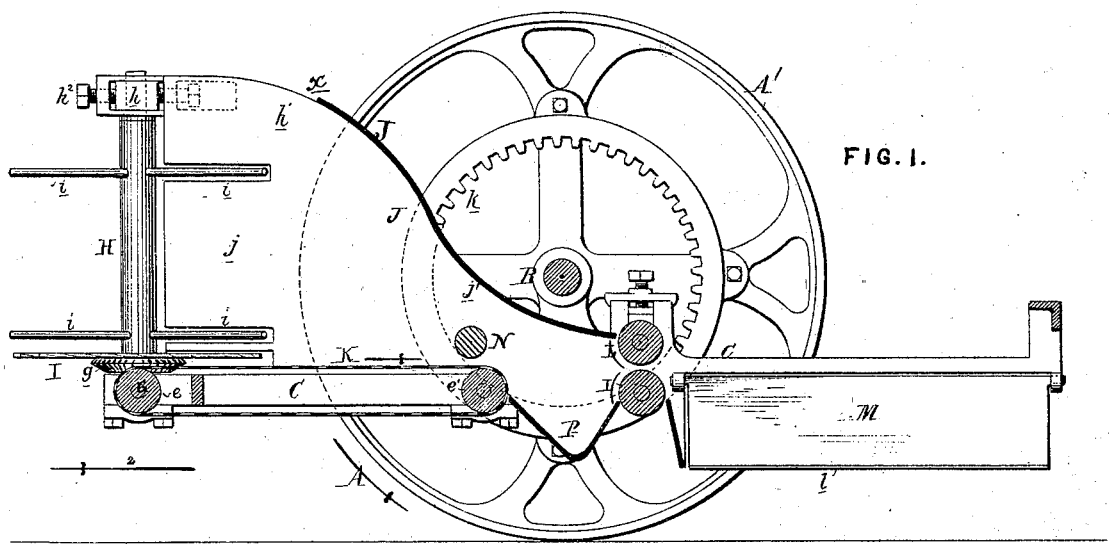
Figure 2:
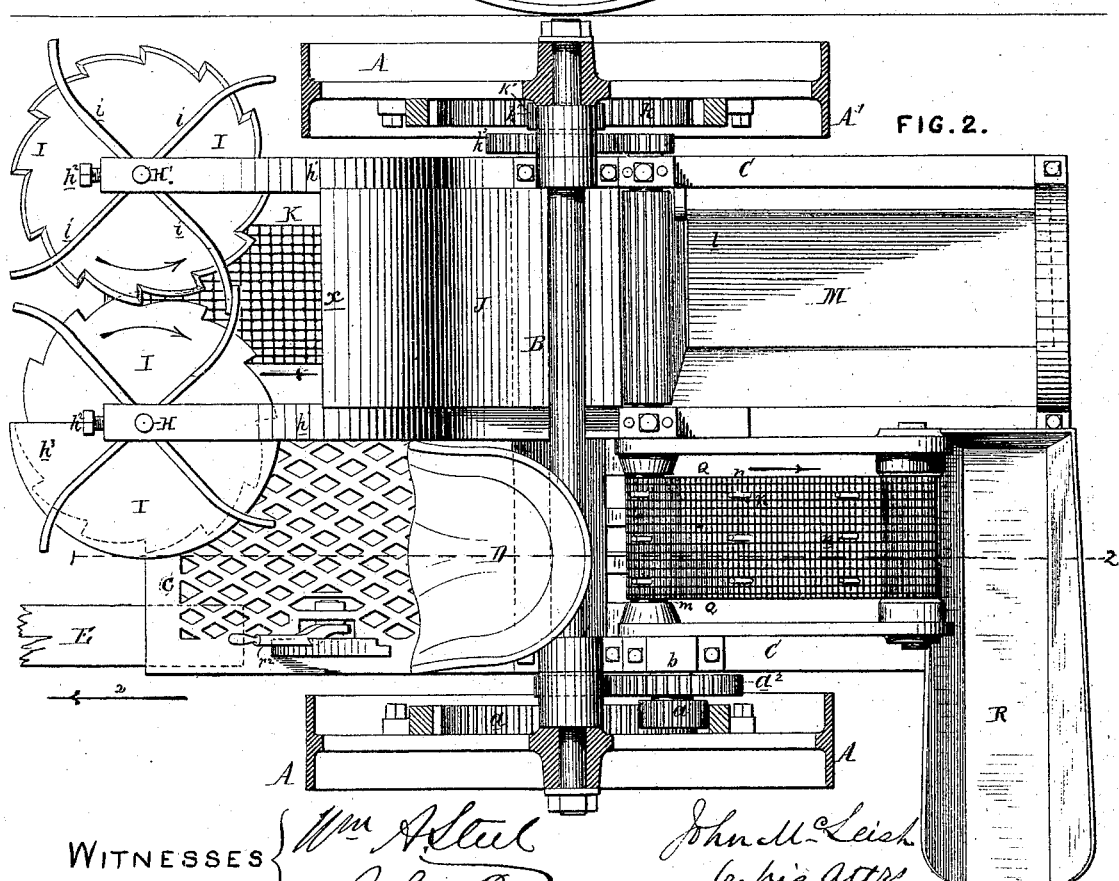
Figure 3:
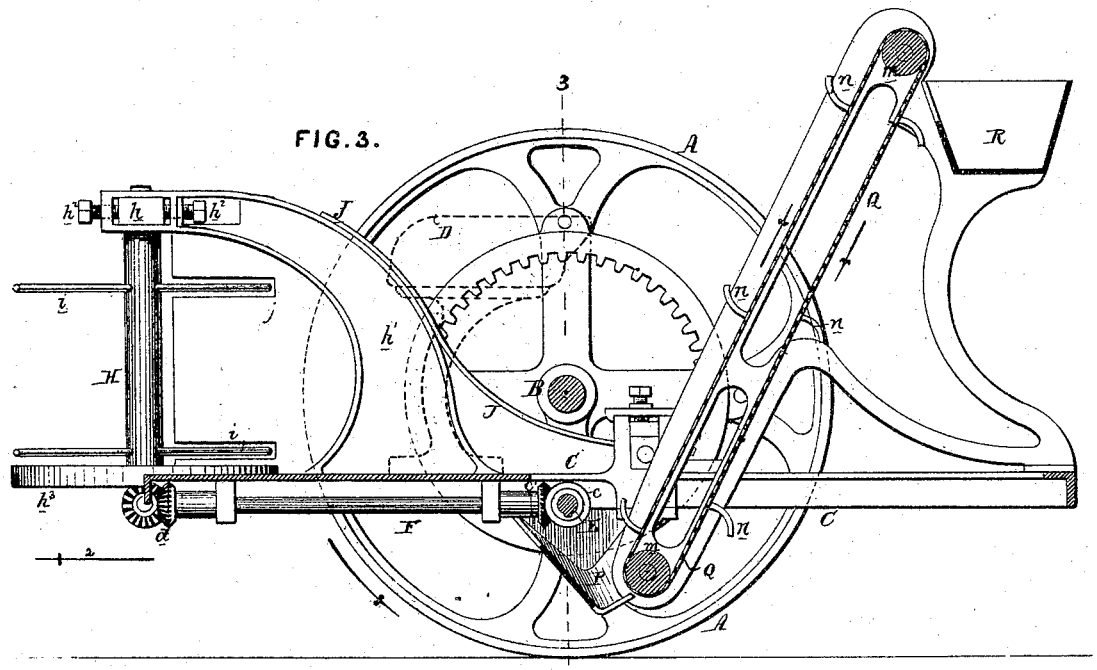
Figure 4:
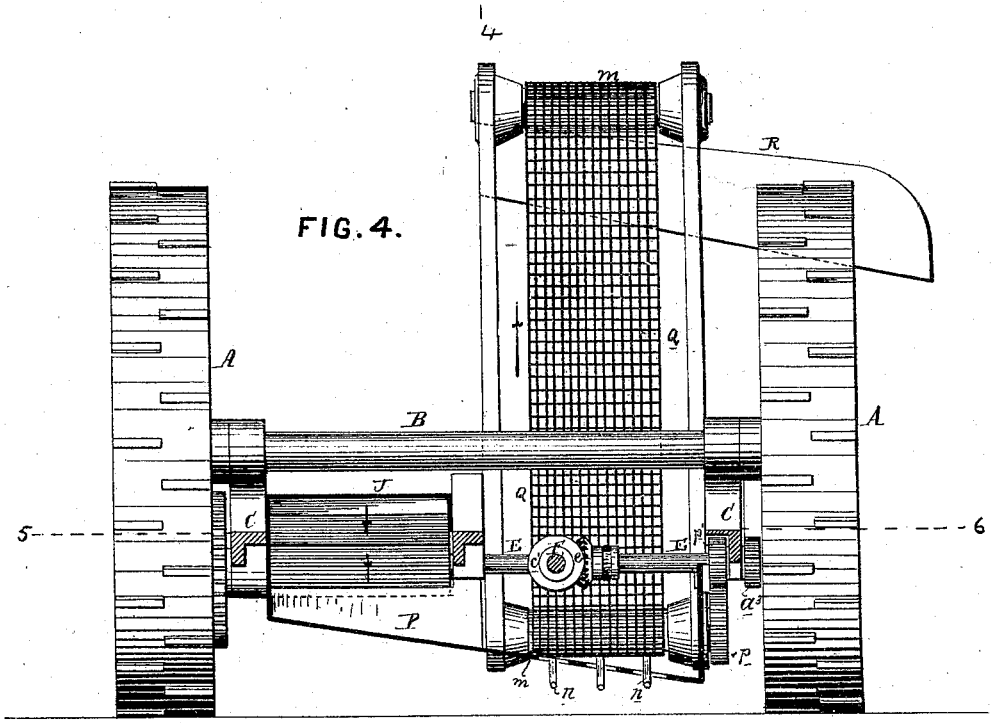
Figure 5:
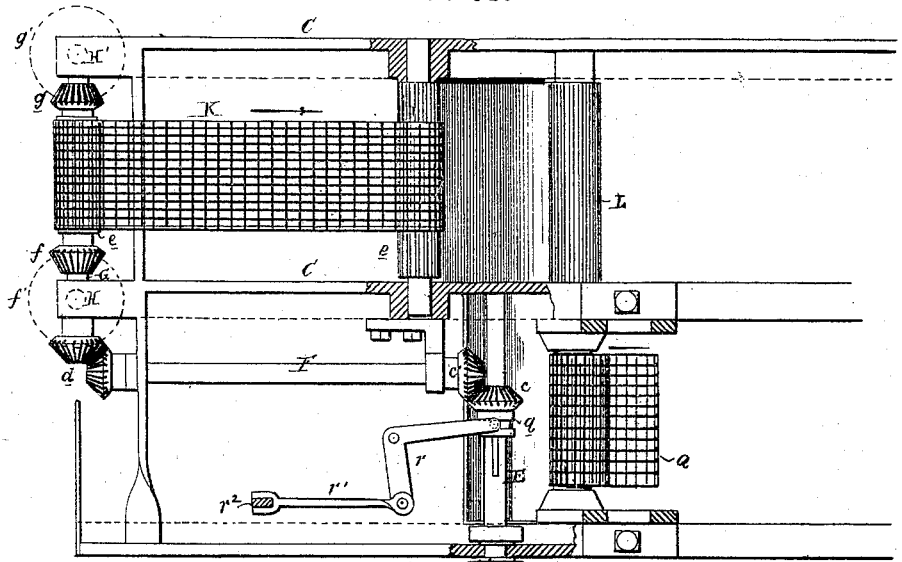
Figures 6, 7:
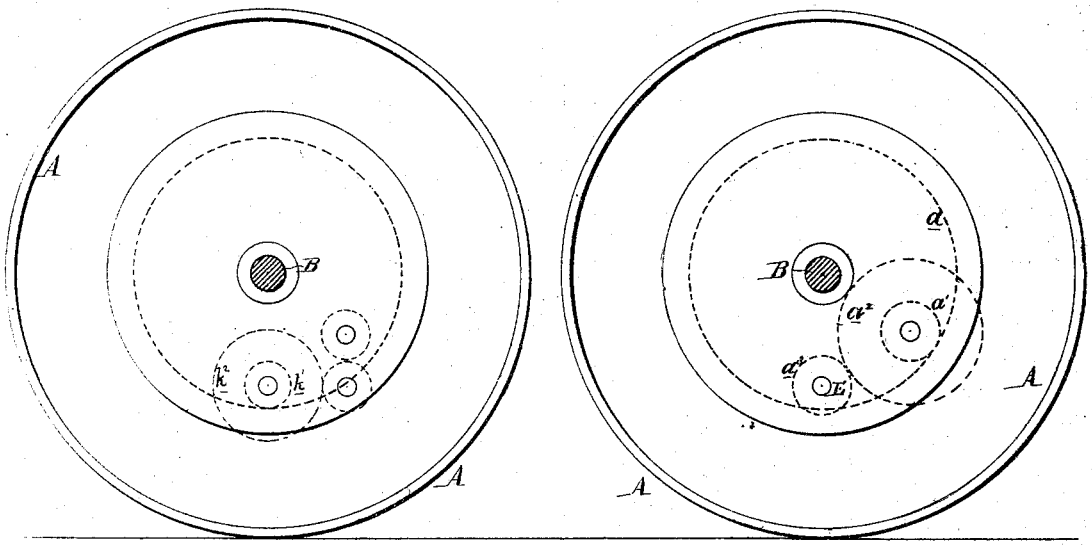

Figure 1, Sheet 1, is a sectional elevation of my improved corn harvester and husker; Fig. 2, a plan view of the same with the driving-wheels in section; Fig. 3, Sheet 2, a sectional elevation on the line 1 2, Fig. 2; Fig. 4, transverse section; Fig. 5, Sheet 3, a sectional plan on the line 5 6, Fig. 4; Figs. 6 and 7, views of the driving-wheels, and of the gearing connected therewith for operating the different parts of the machine; and Fig. 8, a view of a modification.

The driving-wheels A and $A^1$ are hung to a heavy transverse axle, B, from which is suspended the frame C of the machine, the latter supporting the whole of the operating devices and the driver's seat D, and having secured to it in front and somewhat to one side a draft-pole, E. The wheels may be permanently fixed to and turn with the axle; but I prefer that they should be hung loosely to and turn independently of the same, as shown in the drawing. An internal cog-wheel, $a$, is secured to or forms part of the driving-wheel A, and meshes with a pinion, $a^1$, on a short spindle hung to a bearing, $b$, of the frame; the said spindle being provided also with a larger cog-wheel, $a^2$, from which motion is transmitted to a pinion, $a^3$, on a spindle, E, directly beneath and parallel with the axle. (See Figs. 2, 5, and 6.) A bevel-wheel, $c$, on the spindle E gears into a corresponding bevel-wheel, $c^1$, on a spindle, F, which extends toward the front of the machine, and transmits motion through bevel-gears $d^1$ to a third horizontal spindle, G, the latter being provided with a roller, $e$, and with two bevel-wheels, $f$ and $g$, which gear into larger bevel-wheels $f'$ and $g'$ at the lower ends of the two vertical spindles H and H′, the upper ends of which turn in boxes $h$, adapted to recessed standards $h^1$ of the frame, and rendered adjustable therein by means of set-screws $h^2$. (See Figs. 1, 3, and 5.) The cutters, by which the stalks of corn are severed, consist of two overlapping circular plates or disks, I I, hung to the lower ends of the spindles H and H′, and receiving their motion from the latter. These disks have notches or teeth extending entirely around their peripheries, resembling the teeth of a circular saw, and one of the said disks is beveled downward and the other upward, so as to form sharp cutting-edges, resembling those of a pair of shears, the cutters overlapping each other, as before mentioned, so that the stalks may be seized and dragged inward by the teeth, and be instantly severed by the combined sawing and shearing action of the same. By means of the sliding boxes $h$ and set-screws $h^2$ the spindles H and H′ may be adjusted so as to enable the overlapping cutters to be "lined up" or adjusted toward or from each other in the same manner as the blades of a pair of shears; the cutters, in other words, being so adjusted that, instead of revolving on the same plane, they may be slightly inclined in respect to each other in order to be brought in contact at the edges. One or both of the cutters may be partially inclosed within a guard or casing, as seen in Fig. 2. Each of the spindles H and H′ is provided with a number of curved arms $i$, by which the stalks are drawn in toward the cutters. Slotted plates $j$ act as clearers to arms $i$, and to prevent stalks falling out. These arms may either be used independently or in connection with an additional set of arms, $i'$, shown in Fig. 8, and fully described hereafter. The side plates $j$ are slotted to permit the passage of the arms $i$. At the rear of the cutters and beaters is a tapering or funnel-shaped casing, J, secured to the standards $h^1$ of the frame, and having a top of the peculiar curved shape shown in Fig. 1. At the bottom of this casing, and extending beneath the cutters, is a conveyer, $k$, consisting of an endless apron passing around the roller $e$ of the spindle G, and around another roller, $e'$, at the rear contracted end of the casing. This endless apron or conveyer I prefer to make of wire-gauze or chains, with projections or points over its entire surface, so that the butts of the stalks may be carried back by the same into the casing without having any tendency to slip. At the extreme rear end of the casing J are two serrated or ribbed husking-rolls, L L, hung to the frame, geared together, and receiving their motion from the driving-wheel A' through the medium of an internal cog-wheel, $k$, on the latter, and two pinions, $k^1$ and $k^2$, of different diameters. (See Figs. 1, 2, and 7.) At the rear of the husking-rolls is a trough, M, into which the stalks are received after passing between the said rolls. One side of this trough is stationary, and the other consists of a hinged door or trap, $l$, arranged to be opened at intervals by means of a rod operated by a cam on one of the driving-wheels, so as to drop the accumulated stalks upon the ground. An idler-roller, N, is arranged within the casing J, directly over the conveyer K, for the purpose of holding the stalks down upon the latter. Between the rear end of the conveyer and the husking-rolls is an inclined trough or hopper, P, Figs. 1, 3, and 4, which receives the ears of corn as they are separated from the husks and stalks, and convey the same transversely across the machine to the base of an inclined endless apron, Q, which extends around rollers $m$ and $m'$, and is provided at intervals with hooks $n$, by which the ears of corn are raised from the trough P, and deposited in a second inclined trough, R, at the top of the machine. The endless apron Q is driven by its lower roller $m$, the spindle of which has at one end a cog-wheel, $p$, gearing into a wheel, $p'$, on a spindle, E. (See Fig. 4.) The bevel-wheel by which motion is transmitted from the spindle E to the spindle F, and thence to the cutters, beaters, and conveyer K, is operated in such a manner as to throw the bevel-wheel in or out of gear by a lever, $r^2$, extending upward through the platform C to a point in front of the drivers' seat. It is not absolutely necessary that the spindle F and its bevel-gear should be employed, as a chain belt might be substituted for the same to transmit motion from the spindle E to the spindle G.

The operation of the machine is as follows: After throwing the bevel-wheel $c$ into gear with the wheel $c'$, the machine is drawn forward over the ground in the direction indicated by the arrow 2, Figs. 1, 2, and 3, when the several parts will be turned in the direction of their respective arrows. The machine is driven parallel with the rows of corn to be cut, and is so guided that the revolving cutters I I shall advance directly toward the stalks of each hill. The standing stalks pass between the revolving cutters, are seized and dragged in and severed by the combined drawing and shearing action of the same, as before described, and when thus cut are immediately carried backward clear of the cutters, and onto the wire apron K, by means of the curved arms $i$ $i$. The stalks when thus thrust backward still remain in a standing position, with their butts resting upon the apron, until their upper portions strike a shoulder, $x$, at the top of the casing J. This shoulder $x$ retains the upper portions of the stalks while the butts are being carried inward by the apron K, so that the said stalks must necessarily assume first an inclined and then a horizontal position, and be eventually carried inward by the apron, butt-end foremost, to the husking-rolls L L. The curved arms or beaters $i$ $i$, besides carrying in the stalks, serve also to retain the same in a vertical position, and thus prevent them from falling outward, until they are acted on and turned, as before described, by means of the casing J and wire-apron. The downwardly-curved top of the casing or deflector J prevents the stalks from rising and passing over instead of between the husking-rolls, as they would otherwise have a tendency to do, owing to the velocity with which they are thrust backward when the machine is in rapid operation. This rising of the stalks is also prevented when they approach the husking-rolls by the idler-roll N, arranged above the conveying-apron, close to the rear end of the same. The stalks pass between the serrated rolls L L, butt-end foremost, and drop into the receptacle M, and are discharged from the latter at intervals; when a sufficient number has accumulated, by the opening of the trap $l$, operated, as before mentioned, by devices connected with one of the driving-wheels. When the stalks thus pass between the rolls, the ears of corn, being too large to also pass through, are forced by the rolls out of the husks, and drop into the inclined trough or hopper P, through which they are conveyed to the base of the inclined endless conveyer Q; the hooks $n$ on the latter picking up the ears and carrying them up to and depositing them in the trough R, from which they are discharged into a cart or other vehicle driven alongside of the machine.

Figure 8:
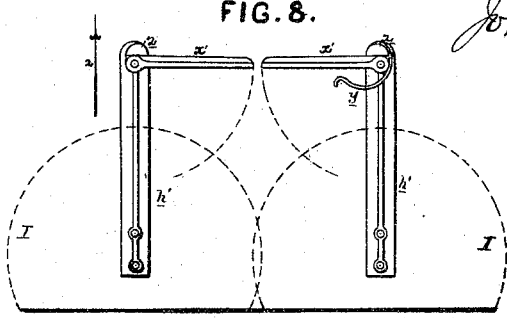

Fig. 8 illustrates an arrangement of arms which may be used, instead of or in connection with the arms $i'$, for preventing the stalks from falling outward after they have been severed by the rotary cutters I I. These arms, indicated by the letters $x'$ $x'$, are hung to the tops of the standards $h^1$, are acted on by springs $y$, and extend horizontally toward each other, as shown, they being held in this position against the shoulders $z$ of the standards by the springs.

When the machine advances toward a hill of corn in the direction of the arrow, the arms, on being struck by the stalks, will yield and permit the passage between them of the latter, and will then immediately spring to their original positions, so as to prevent the stalks, when severed, from falling outward.

I claim as my invention—

1. The combination of the dragging-cutters, constructed and operating substantially as described, and the traversing band extending beneath the cutters, as set forth.

2. The circular cutting-plates, adjustable by set-screws, or their equivalents, operating on the spindles to which the plates are attached, as set forth.

3. The combination of the cutting-plates, their spindles, curved arms $i'$ on the said spindles, and the side plates slotted for the passage of said arms.

4. The combination of the cutters K and the casing J, having a shoulder, $x$, at the top, the whole operating substantially as described, so as to carry in and turn down the standing stalks of corn, and lay them in a horizontal or nearly-horizontal position upon the conveyer K.

5. The combination, substantially as described, of the conveyer K, husking-rollers L L, and the casing or deflector J, curved downward toward the husking-rolls.

In testimony whereof I have signed my name to this specification in the presence of two subscribing witnesses.

JOHN McLEISH.

Witnesses:
WM. A. STEEL,
JOHN K. RUPERTUS.